(12) United States Patent
Oliver

(10) Patent No.: US 6,693,672 B1
(45) Date of Patent: Feb. 17, 2004

(54) METHOD AND APPARATUS FOR DETECTING SET OF IMAGES AND SELECTING MOST FOCUSED IMAGE

(75) Inventor: Thomas C Oliver, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/315,431

(22) Filed: May 20, 1999

(51) Int. Cl.[7] ............................................. H09N 5/232
(52) U.S. Cl. .................................. 348/345; 348/231.99
(58) Field of Search .............................. 348/345, 346, 348/348, 349, 351, 231.99, 231.2, 231.3; 250/208.1, 201.3; 396/101–104

(56) References Cited

U.S. PATENT DOCUMENTS

| | | | |
|---|---|---|---|
| 4,404,594 A | | 9/1983 | Hannan |
| 4,560,864 A | * | 12/1985 | Kinoshita et al. ........ 250/201.7 |
| 5,107,337 A | | 4/1992 | Ueda et al. |
| 5,227,890 A | | 7/1993 | Dowski, Jr. |
| 5,307,170 A | * | 4/1994 | Itsumi et al. ............. 348/219.1 |
| 5,666,569 A | * | 9/1997 | Fullam et al. .............. 396/101 |
| 5,675,141 A | * | 10/1997 | Kukihara ................ 250/201.3 |

FOREIGN PATENT DOCUMENTS

| JP | 90096513 A | 4/1997 |
|---|---|---|
| JP | 11177873 A | 7/1999 |

OTHER PUBLICATIONS

R.A. Jarvis, "Focus Optimization Criteria for Computer Image Processing", Microscope 24, pp. 163–180 (1976).

Guido Ligthart and Frans C.A. Groen, "A Comparison of Different Autofocus Algorithms", Proceedings of IEEE International Conference on Pattern Recognition, pp. 597–600 (1982).

Je–Ho Lee, et al., "Implementation of a Passive Automatic Focusing Algorithm for Digital Still Camera", IEEE Transactions on a Consumer Electronics, vol. 41, No. 3, pp. 449–454 (Aug. 1995).

* cited by examiner

Primary Examiner—Tuan Ho

(57) ABSTRACT

A digital image recording device with a fixed lens system for easily and automatically recording a focused image of an object. Successive images of the object are recorded at various object-to-lens distances, and a program is used to select the image stored in memory which is closest to be in focus. The program could be stored either in static or dynamic memory. In a representative embodiment, this image is selected by computing image contrast values obtained using a focus function. The image corresponding to the largest focus function value is selected as the one closest to being in focus.

7 Claims, 8 Drawing Sheets

METHOD AND APPARATUS FOR DETECTING SET OF IMAGES AND SELECTING MOST FOCUSED IMAGE

FIELD OF THE INVENTION

The present invention relates generally to digital image recording devices, more particularly to digital cameras and digital video cameras, and even more particularly to the focus of such devices.

BACKGROUND OF THE INVENTION

In order to record clear images of objects at varying distances from a digital image recording device such as a digital camera or digital video camera, the image projected onto the film or image sensor used for image capture must be in focus. A typical method to obtain such focus is to vary the distance between the lens and the plane of the film or image sensor either manually or automatically in relation to the distance from the object to the lens.

However, less expensive cameras can be produced using a fixed lens system. In such cameras, the distance from the lens to the plane of exposure is fixed. Now, however, obtaining a clear image becomes more difficult, as the camera must be moved to a fixed distance from the object at which the object is in focus. The focus object-to-lens distance is defined by the focal length of the lens system and the lens-to-plane-of-exposure distance, wherein the lens-to-plane-of-exposure distance is the distance between the lens of the digital image recording device and the plane of the film or image sensor used to record the image of the object. Among other means, the focus object-to-lens distance can be obtained and subsequently adjusted by either (1) guessing the distance, (2) using an optical range-finder, (3) forming two images on an image sensor from two lenses located a short distance apart, using a mirror to move one of the images until the two sets of signals produced by the two images on the sensor have maximum correlation, and then correlating the object-to-lens distance with the position of the mirror, (4) measuring the time taken for an ultrasonic wave pulse to reach the object and be reflected back to a detector on the camera, (5) measuring the amount of light or infra-red radiation reflected back from a scene from an emitted flash and correlating that measurement to the object-to-lens distance based on the average reflectance observed with scenes of average reflectance, and (6) viewing the image prior to exposure as in a single-lens reflex camera. All these methods are useful, but all have their disadvantages. Guessing is at best error prone, while the other techniques are expensive and time consuming as they may require additional equipment and several iterations of measurements with subsequent adjustment of the object-to-lens distance before making an exposure. In addition, false readings may occur in some situations depending upon the technique used. As an example, a heavily illuminated scene could indicate a false object-to-lens distance if that distance is set using the measurement of object reflected light from an emitted flash. Lens systems having a large range of object-to-lens distances in which the image of the object is in focus have also been used but are useful only when object-to-lens distances are large.

Thus, there is a need for an image exposure system that can easily, accurately, inexpensively, and automatically capture focused images using fixed lens systems.

SUMMARY OF THE INVENTION

In preferred embodiments, the present patent document describes method and apparatus for obtaining a focused image using a digital image recording device having a fixed lens-to-plane-of-exposure distance, wherein the lens-to-plane-of-exposure distance is the distance between the lens of the digital image recording device and the plane of the film or image sensor used to record the image. In a preferred embodiment, a digital image recording device, which could be a digital camera or a digital video camera, automatically records a set of successively detected images of an object at varying object-to-lens distances and identifies the image most in focus of the set of images recorded.

To obtain the set of images, either the camera or the object whose image is to be recorded is moved relative to the other. A preferred embodiment computes a contrast value for each stored image and chooses the image with the greatest contrast value to be the image most in focus. The other images are more blurred, thus having a smaller computed contrast value.

In an alternative embodiment, a distance determination device detects the position at which the image projected onto the image sensor is in focus and automatically enables recording of the image detected at that distance. The distance determination device could be a distance meter or similar device.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

Figure 1:
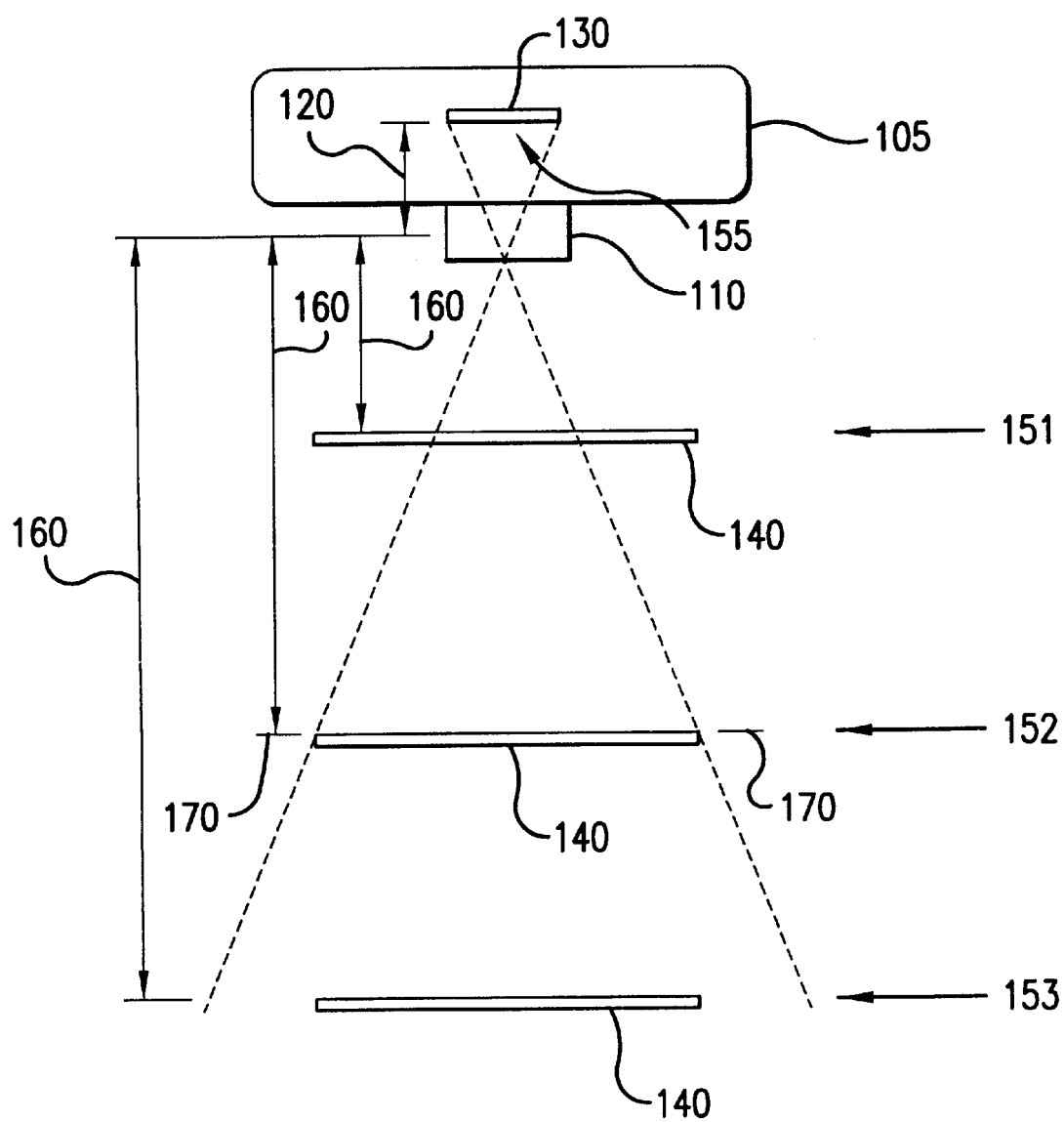
FIG. 1 is a drawing of a digital image recording device in accordance with the invention.

As shown in the drawings for purposes of illustration, the present patent document describes method and apparatus for obtaining a focused image using a digital image recording device having a fixed lens-to-plane-of-exposure distance, wherein the lens-to-plane-of-exposure distance is the distance between the lens of the digital image recording device and the plane of the film or image sensor used to record the image of an object. In a preferred embodiment, a digital image recording device, such as a digital camera or a digital video camera, having a fixed lens-to-plane-of-exposure distance automatically records a set of successively detected images of an object and identifies the most focused image of the set of images recorded. In the following detailed description and in the several figures of the drawings, like elements are identified with like reference numerals.

2. Discussion

FIG. 1 is a drawing of a digital image recording device 105 in accordance with the invention. In a preferred embodiment, the digital image recording device 105 comprises a lens 110 and an image sensor 130 wherein the lens 110 is placed at a fixed distance from the image sensor 130. This fixed distance is referred to herein as the lens-to-plane-of-exposure distance 120 and also as the lens-to-image-sensor distance 120. The digital image recording device 105 could be, for example, a digital camera 105 or a digital video camera 105. In FIG. 1, an object 140 is shown at a first, a second, and a third positions 151,152,153 relative to the digital image recording device 105. The object-to-lens distance 160 of the first position 151 is less than the object-to-lens distance 160 of the second position 152, and the object-to-lens distance 160 of the second position 152 is less than the object-to-lens distance 160 of the third position 153. These relative positions 151,152,153 could be obtained by movement of either the object 140 or the digital image recording device 105. Note that in FIG. 1 an image 155 of the object 140, which could be for example the image 155 of a sheet of paper 140, is only projected in focus onto the image sensor 130 when it is placed in a fixed focal plane 170 of the lens 110 which is shown in FIG. 1 as the second position 152. At other object-to-lens distances 160 the image 155 of the object 140 projected onto the image sensor 130 will be out of focus.

Figure 2:
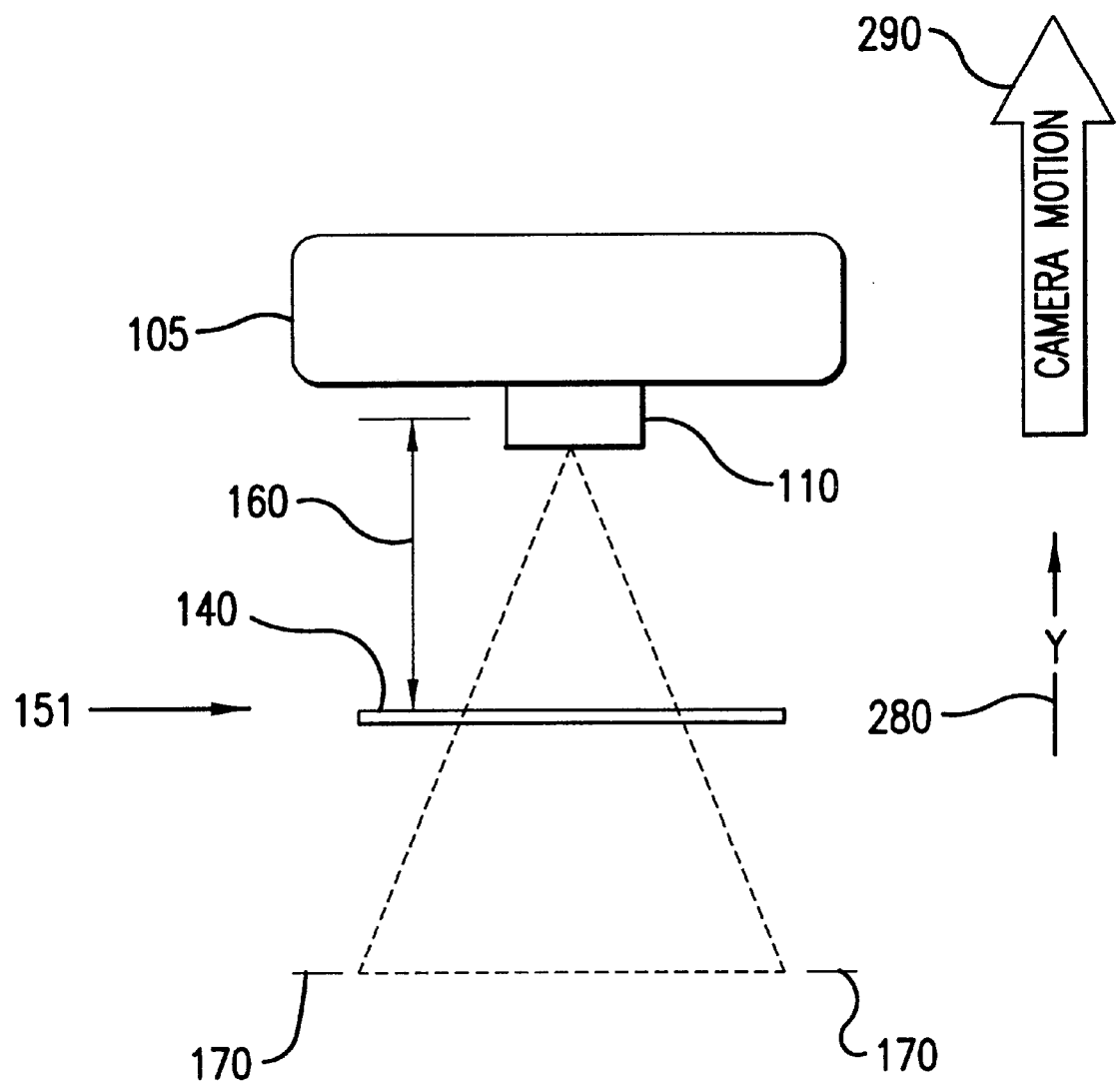
FIG. 2 is another drawing of the digital image recording device in accordance with the invention.

FIG. 2 is another drawing of the digital image recording device 105 in accordance with the invention. In FIG. 2 the object 140 is located at the first position 151. In this situation the image 155 of the object 140 projected onto the image sensor 130 is out of focus as the fixed focal plane 170 lies at a greater distance from the lens 110 than the object 160 does. For purposes of ease and clarity of illustration, the image sensor 130 and the image 155 are shown in FIG. 1 but not in FIG. 2. As shown in FIG. 2, an operator moves the digital image recording device 105 away from the object 140 parallel to a y-axis 280 in the direction indicated as camera motion 290, thereby increasing the object-to-lens distance 160.

Figure 3:
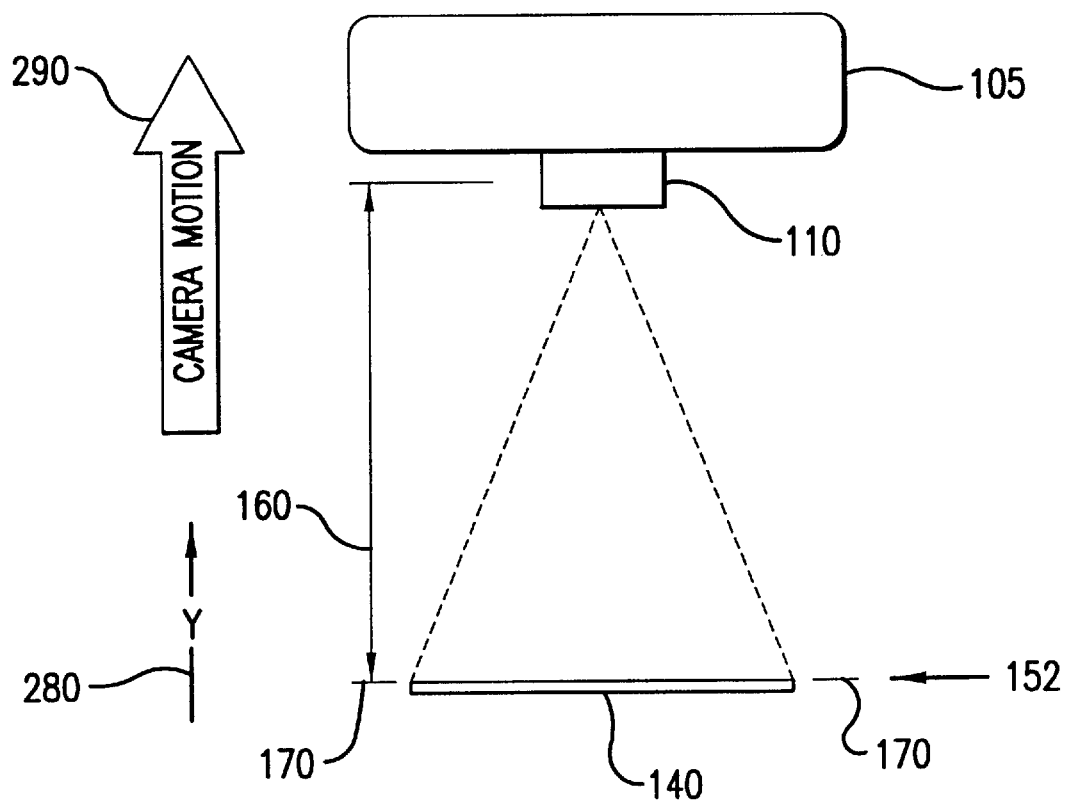
FIG. 3 is yet another drawing of the digital image recording device in accordance with the invention.

FIG. 3 is yet another drawing of the digital image recording device 105 in accordance with the invention. In FIG. 3 the digital image recording device 105 has been moved away from the object 140 with respect to its location in FIG. 2. In fact, the object 140 of FIG. 3 is now located at the second position 152, and the image 155 of the object 140 projected onto the image sensor 130, is now in focus, as the fixed focal plane 170 lies at the same distance from the lens 110 as the object 140 does. Again, for purposes of ease and clarity of illustration, the image sensor 130 and the image 155 are shown in FIG. 1 but not in FIG. 3. As indicated in FIG. 3, the operator continues to move the digital image recording device 105 away from the object 140 in a direction parallel to the y-axis 280 in the direction indicated as camera motion 290 in both FIGS. 2 and 3, thereby increasing the object-to-lens distance 160. While, for illustrative purposes in FIGS. 2 and 3, only two positions 151,152 have been shown for the object 140 with respect to the lens 110, in the preferred embodiment the object-to-lens distance 160 continuously changes from the first position 151, wherein the object-to-lens distance 160 is less than the distance from the lens 110 to the fixed focal plane 170, through the second position 152, wherein the image 155 projected onto the image sensor 130 is in focus, to the third position 153, wherein the object-to-lens distance 160 is greater than the distance from the lens 110 to the fixed focal plane 170. It will be noted that it is immaterial whether the digital image recording device 105 or the object 140 is moved. It is also immaterial whether the relative motion between the object 140 and the digital image recording device 105 is away from or toward each other. It is the relative motion between the two that is important.

Figure 4:
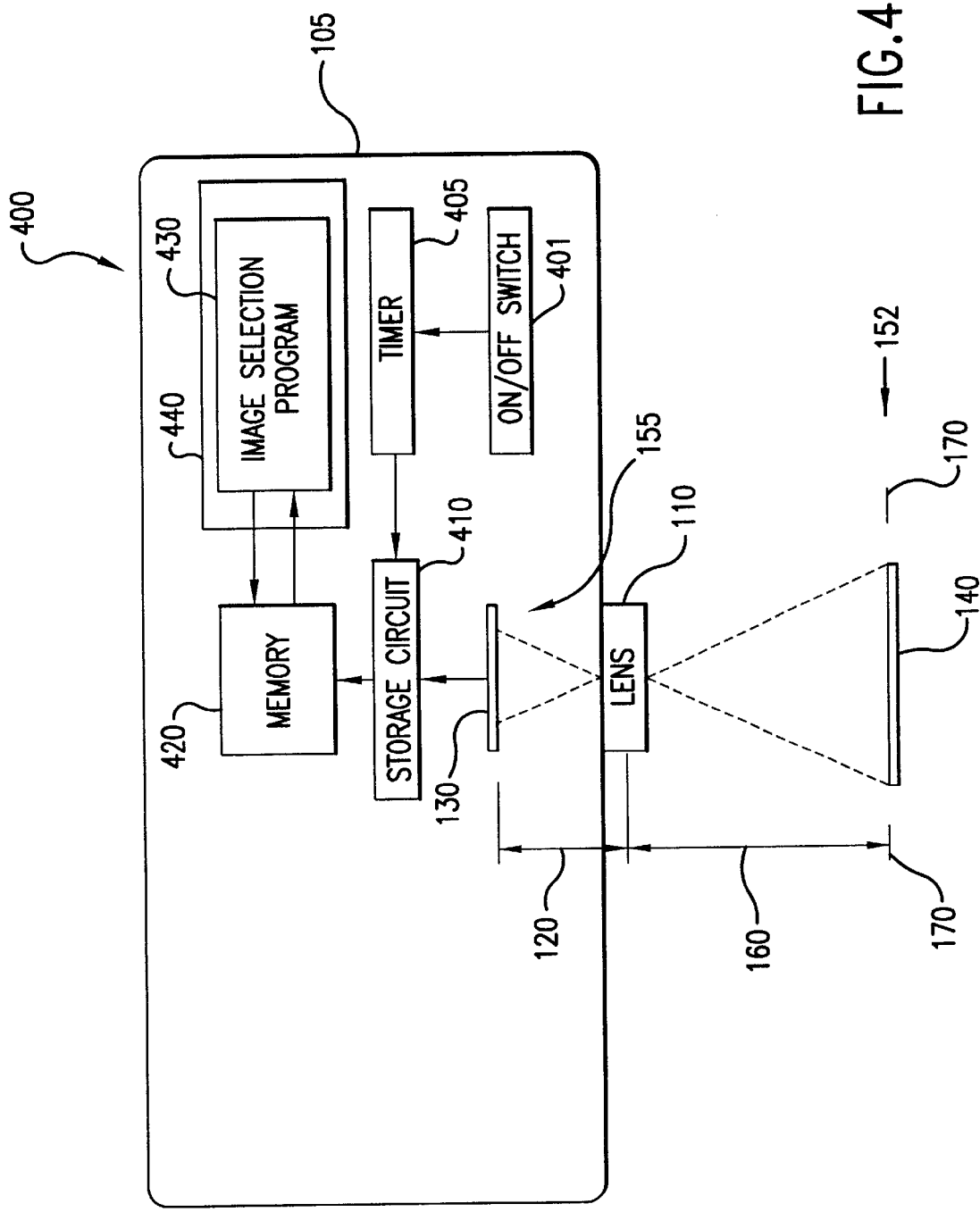
FIG. 4 is a drawing of a digital image system in accordance with the invention.

FIG. 4 is a drawing of a digital image system 400 in accordance with the invention. FIG. 4 shows the object 140 located at the fixed focal plane 170 of the lens 110. This location in FIG. 4 is for illustrative purposes only, as in operation the digital image recording device 105 is moved relative to the location of the object 140. As the digital image recording device 105 or equivalently the object 140 is moved, successive images 155 are projected onto the image sensor 130. Upon activation, a storage circuit 410 enables storage of the image data in a memory 420. Though other means are possible, the storage circuit 410 could be activated by a timer 405, wherein the timer 405 is turned on and off by an on/off switch 401. Thus, a series of images 155 at varying object-to-lens distances 160 are recorded in the memory 420. An image selection program 430 executed on a digital signal processor 440 retrieves the images 155 from the memory 420 and determines the one image 155 having the best focus. The program 430 could be stored either in static or dynamic memory within or attached to the digital signal processor 440. Static memory could be for example ROM, and dynamic memory could be for example RAM or flash memory. Following the determination of the image 155 having best focus, the remaining images 155 may be deleted from the memory 420.

Figure 5:
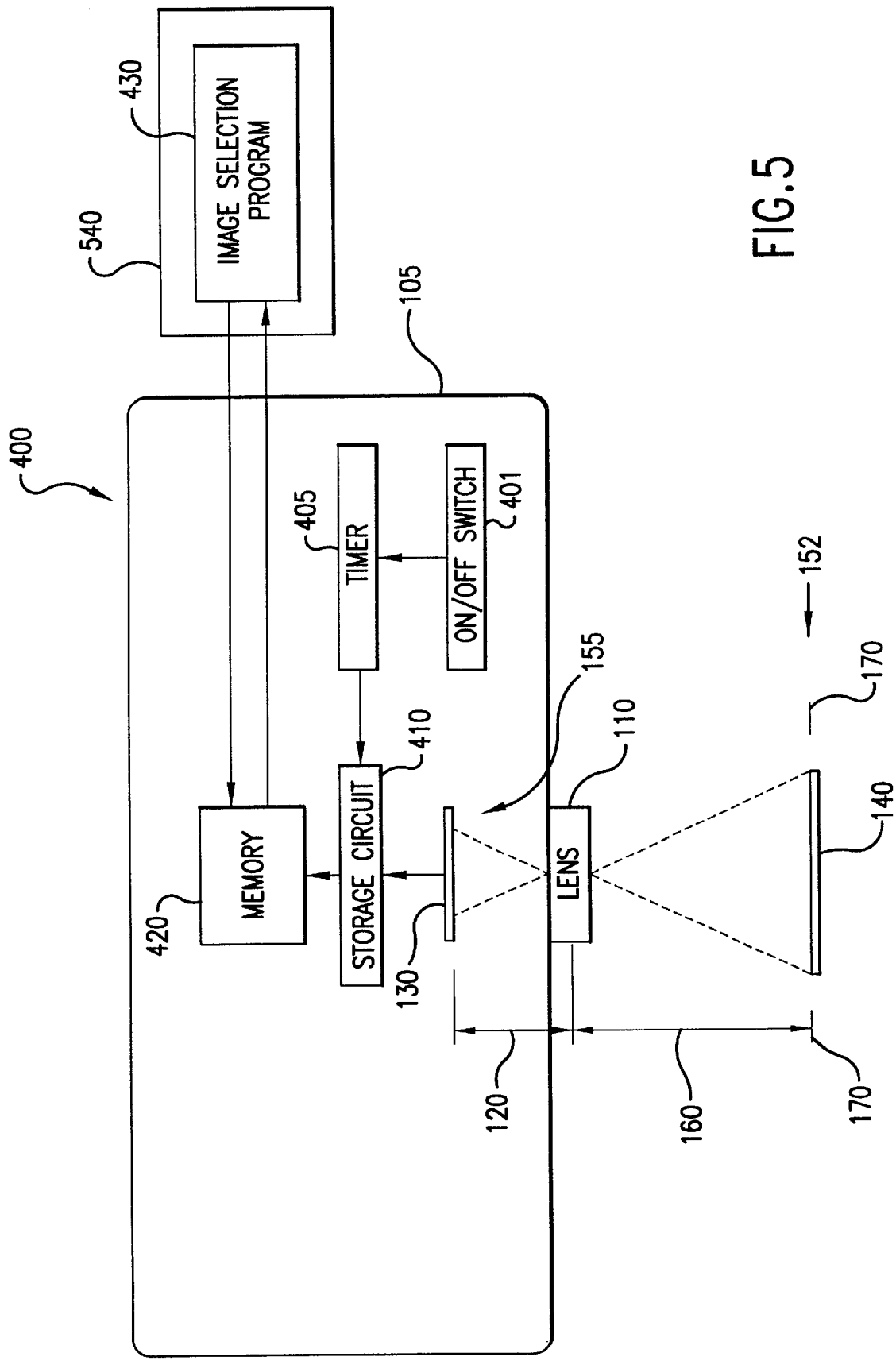
FIG. 5 is another drawing of a digital image system in accordance with the invention.

FIG. 5 is another drawing of a digital image system 400 in accordance with the invention. In this embodiment, the image selection program 430 is executed on a computer 540. In this embodiment, images 155 can be stored in the memory 420 and transferred at a later time to the computer 540, wherein the image selection program 430 determines the one image 155 having the best focus. The program 430 could be stored either in static or dynamic memory within or attached to the computer 540. Static memory could be for example ROM or Compact Disk (CD), and dynamic memory could be for example RAM, hard disk, floppy, or flash memory.

Figure 6:
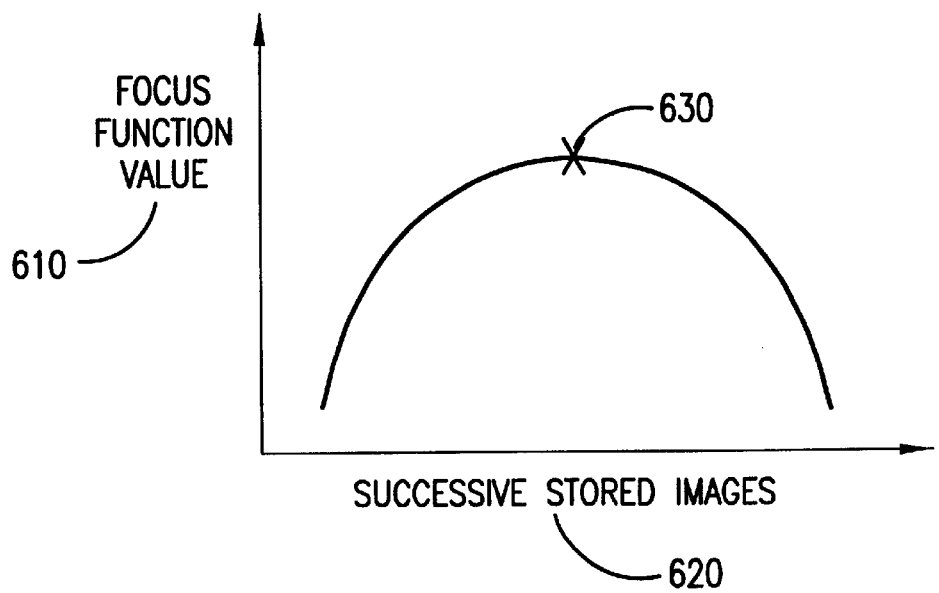
FIG. 6 is a graph of the results of computing a contrast value for successive stored images in the memory in accordance with the invention.

FIG. 6 is a graph of the results of computing a focus function value 610, which could be for example a contrast function value 610, for successive stored images 155 in the memory 420 in accordance with the invention. In various embodiments, the successive images 155 are taken as illustrated by FIGS. 1–5. While for illustrative purposes, the graph of FIG. 6 is shown as a continuous curve, it is in fact a graph of a set of discrete values with one value for each stored image 155, of which each was taken at a given object-to-lens distance 160 in accordance with the invention. In representative examples, this graph is obtained by computing a focus function value 610 for each image 155 indicated in FIG. 6 as successive stored images 620 in the memory 420 of FIG. 4, for example, using various algorithms such as sum modulus difference, sum of difference squared, sum of difference cubed, sum of difference to the fourth power, sum of difference to a power, absolute gradient, thresholded absolute gradient, squared gradient, Laplacian, thresholded video-signal content, thresholded video signal pixel count, signal power, standard deviation, normalized standard deviation, absolute variation, and normalized absolute variation. As a specific example, using the sum modulus difference method, the focus function value 610 of FIG. 5 for each image is the sum of the absolute difference in intensity between all adjacent pixels in the image. As stated, each exposure stored is related one-to-one to a specific object-to-lens distance 160. It is noted that the maximum in the contrast function value 610 identifies the stored image closest to being focused. All other stored images 155,620 will be somewhat more fuzzy due to their lack of focus and will thus have a lower contrast function value 610. The image selection program 430 selects the image 155,620 corresponding to a maximum contrast value 630, also referred to herein as a largest focus function value 630, as the exposure in focus. All other images may then be deleted from the memory 420.

Figure 7:
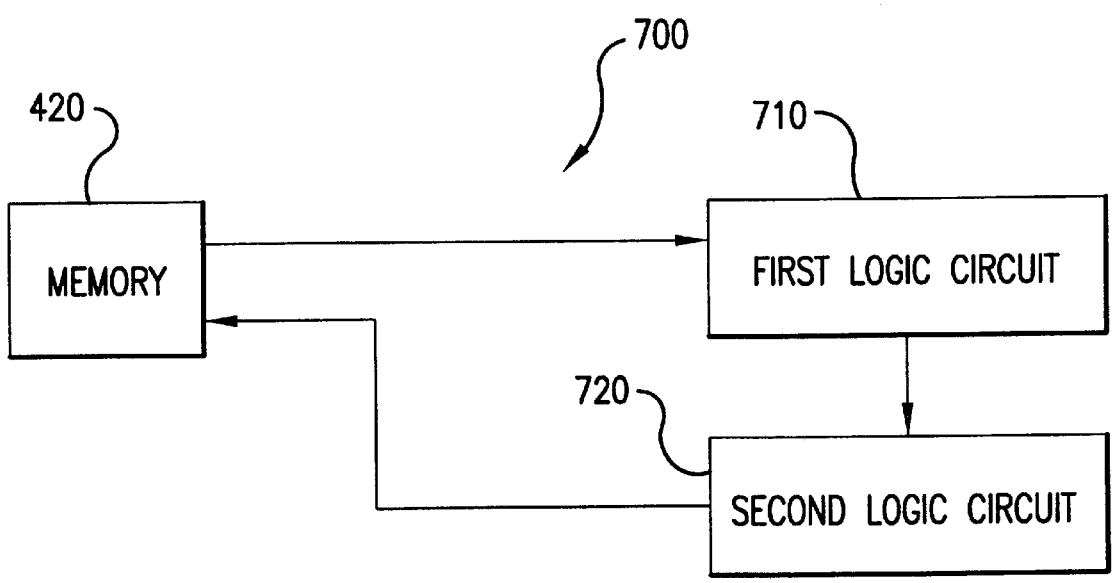
FIG. 7 is a drawing of a circuit for selecting the image most in focus in accordance with the invention.

FIG. 7 is a drawing of an image selection circuit 700 for selecting the image 155 most in focus in accordance with the invention. The circuit 700 comprises a first logic circuit 710 configured for computation and a second logic circuit 720 configured for selection. Image data is inputted from the memory 420 into the first logic circuit 710. The first logic circuit 710 computes a focus related parameter, which could be for example the focus function value 610 of FIG. 6, for each image inputted into the first logic circuit 710, and transfers the computed focus related parameters to the second logic circuit 720 wherein the image 155 most in focus is selected based upon computed focus related parameters and preselected criteria. All other images 155 stored in the memory 420 may then be deleted or the image 155 most in focus can be transferred to another memory, printed out, or displayed on a computer screen or other output device.

Figure 8:
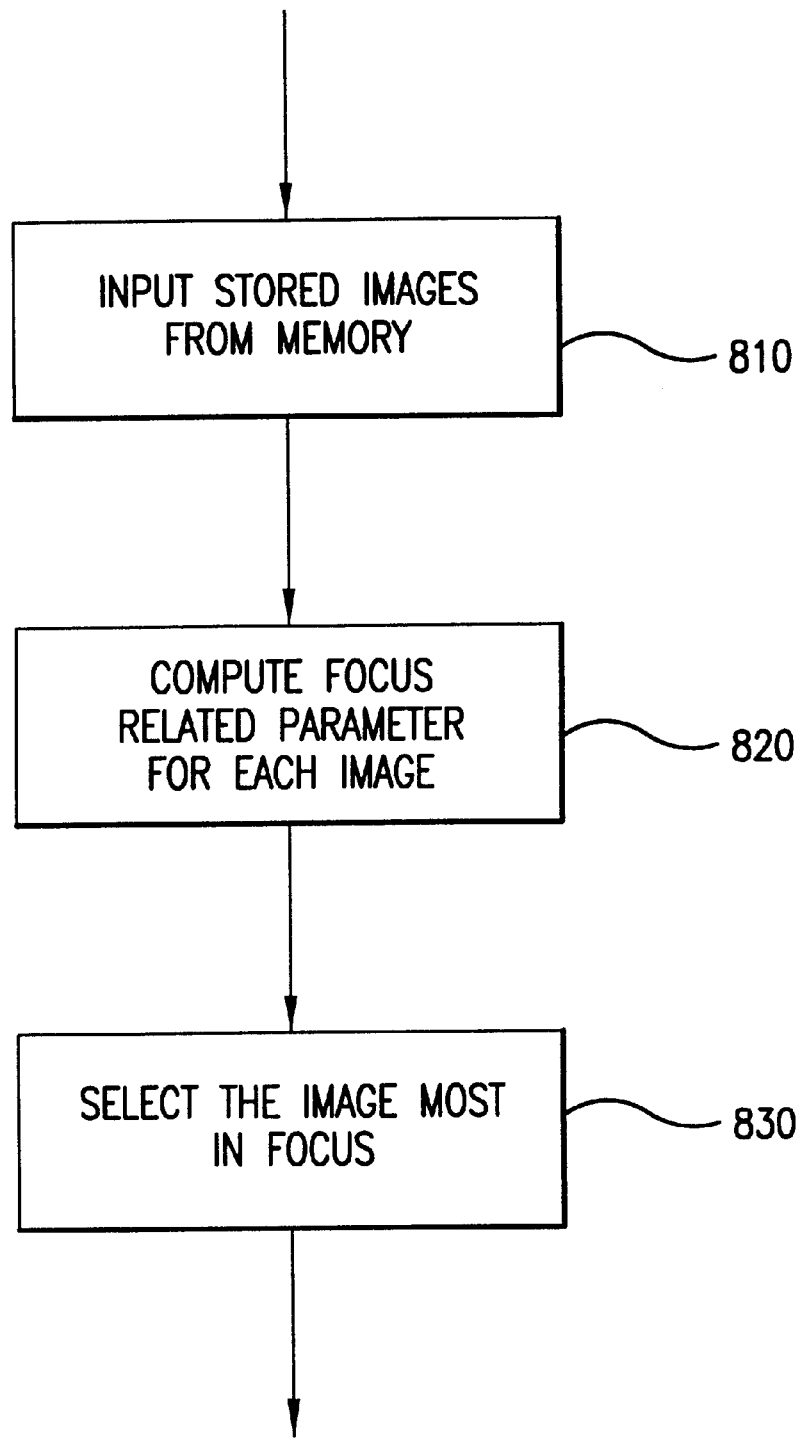
FIG. 8 is a flow chart of method steps for selecting the image most in focus in accordance with the invention.

FIG. 8 is a flow chart of method steps for selecting the image 155 most in focus in accordance with the invention.

In a first representative embodiment, in block 810 images 155 from the memory 420 are inputted into the program 430, wherein the program 430 is executed on the digital signal processor 440 of FIG. 4. Block 810 then transfers control to block 820.

Block 820 computes a focus related parameter, which could be for example the focus function value 610 of FIG. 6, for each image inputted image 155. Block 820 then transfers control to block 830.

Block 830 selects the image 155 most in focus based upon computed focus related parameters and preselected criteria. Block 830 is the termination block for this process.

In a second representative embodiment, the processes of blocks 820 and 830 are implemented as functions of the program 430 executed on the digital signal processor 440 and the process of block 830 is implemented in hardware, as for example the second logic circuit 720 of FIG. 7.

In a third representative embodiment, the processes of blocks 810 and 820 are implemented in hardware, as for example the first logic circuit 710 of FIG. 7 and the process of block 830 is implemented as functions of the program 430 executed on the digital signal processor 440.

In a fourth representative embodiment, the processes of blocks 810 and 820 are implemented in hardware, as for example the first logic circuit 710 of FIG. 7, and the process of block 830 is also implemented in hardware, as for example the second logic circuit 720.

Figure 9:
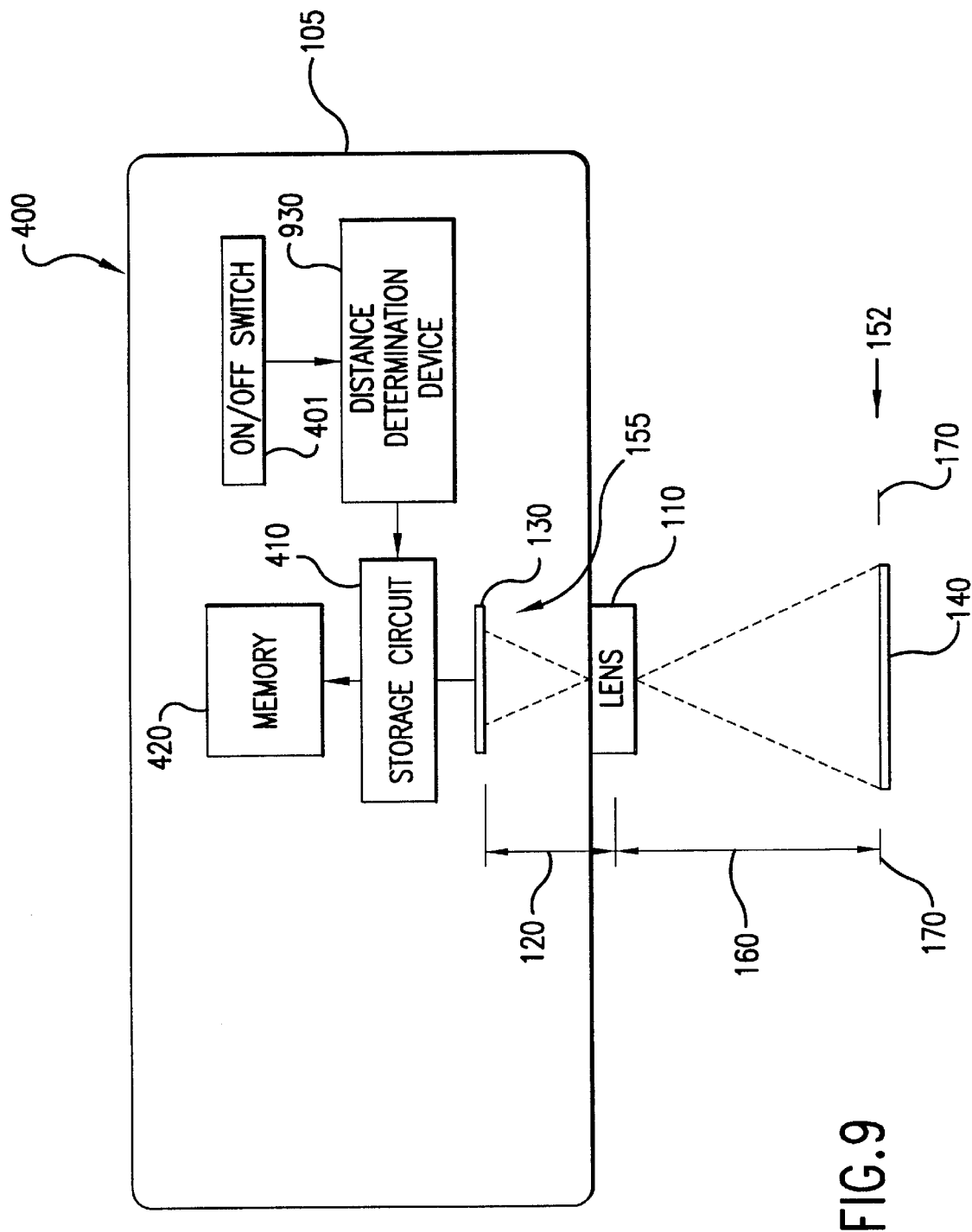
FIG. 9 is an additional drawing of the digital image recording device in accordance with the invention.

FIG. 9 is an additional drawing of the digital image recording device 105 in accordance with the invention. In an alternative embodiment, FIG. 9 shows the object 140 located at the fixed focal plane 170 of the lens 110. This location in this figure is for illustrative purposes only, as in operation the digital image recording device 105 will be moved relative to the location of the object 140. In the embodiment shown in FIG. 9, a distance determination device 930 is activated by the on/off switch 401. As the digital image recording device 105 or equivalently the object 140 is moved the distance determination device 930, which could be for example a distance meter 930 or a range finder 930, identifies the distance at which the image 155 projected onto the image sensor 130 is in focus and automatically activates the storage circuit 410 which enables storing data for the image 155 into the memory 420. The distance meter 930 could, for example, measure distances using a light signal, an infrared signal, or an ultrasound signal. Upon activation the storage circuit 410 enables recording of the image data into the memory 420. Thus, while a series of images at varying object-to-lens distances 160 are projected onto the image sensor 130 only the one image 155 in focus is recorded in the memory 420. Other embodiments are also possible, for example the storage circuit 410 of FIG. 9 could be used to open and close either a mechanical or an electronic shutter, thereby permitting only the focused image on the image sensor 130 to be recorded in the memory 420.

3. Concluding Remarks

A primary advantage of the embodiment as described in the present patent document over prior digital image recording devices 105 having fixed lens systems 110 is the ability to record a focused image automatically. The operator does not have to precisely locate the object 140 in the fixed focal plane 170. Thus, inexpensive, easy to use digital image recording devices 105 can be fabricated using the teachings of the present patent document.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A digital image system for detecting a set of images of an object and for selecting the most focused image of the set, comprising:

an image sensor;

a lens, wherein the lens is located at a fixed distance from the image sensor, wherein the lens projects the images onto the image sensor, and wherein at least two images are detected at different object-to-lens distances;

a storage circuit;

an on/off switch;

a timer connected to the on/off switch and to the storage circuit, wherein activating the on/off switch turns the timer on and wherein at preselected time intervals the timer activates the storage circuit; and logic for selecting the image most in focus.

2. A digital image recording device for recording a focused image of an object, comprising:

image sensor;

a lens, wherein the lens is located at a fixed distance from the image sensor and wherein the lens projects the images onto the image sensor;

a storage circuit connected to the image sensor;

a memory connected to the storage circuit, wherein activation of the storage circuit enables storage of the images in the memory; and a distance determination device connected to the storage circuit, wherein at a preselected object-to-lens distance the distance determination device activates the storage circuit.

3. The digital image recording device as recited in claim 2, wherein the digital image recording device is selected from the group consisting of a digital camera or a digital video camera.

4. The digital image recording device as recited in claim 2, wherein the distance determination device is a distance meter.

5. The digital image recording device as recited in claim 4, wherein the distance meter is selected from the group consisting of a distance meter, wherein a light signal is used to measure distance, a distance meter wherein an infrared signal is used to measure distance, or a distance meter wherein an ultrasound signal is used to measure distance.

6. A method for detecting a set of images of an object and for identifying which image is most in focus, which comprises:

in a digital image system, projecting the images through a lens onto an image sensor, wherein the lens has a fixed lens-to-sensor distance;

changing object-to-lens distance;

for at least two different object-to-lens distances, detecting the images, wherein detecting the images is initiated by:

activating a timer; and at preselected times following timer activation, activating detecting the images; and selecting the image most in focus.

7. A digital image system for detecting a set of images of an object and for selecting the most focused image of the set, comprising:

an image sensor;

a timer connected to the image sensor;

a lens, wherein the lens is located at a fixed distance from the image sensor, wherein the lens projects the images onto the image sensor, and wherein at preselected times the timer enables detecting images corresponding to at least two different object-to-lens distances; and logic for selecting the image most in focus.

* * * * *